United States Patent [19]

Ross et al.

[11] Patent Number: 4,655,372

[45] Date of Patent: Apr. 7, 1987

[54] PAINT DISPENSER

[75] Inventors: Robert N. Ross, Herndon, Va.;
Lippert, Roy O., Orlando, Fla.

[73] Assignee: The Joy of Painting, Reston, Va.

[21] Appl. No.: 652,915

[22] Filed: Sep. 21, 1984

[51] Int. Cl.⁴ ............................................. G01F 11/00
[52] U.S. Cl. ................. 222/391; 192/111 A; 222/327
[58] Field of Search ............... 222/391, 325, 326, 327;
604/209, 210, 232–235, 263; 192/111 A;
401/171, 176, 179, 182

[56] References Cited

U.S. PATENT DOCUMENTS

| | | | |
|---|---|---|---|
| 1,456,717 | 5/1923 | Smith et al. | 604/232 |
| 1,921,912 | 8/1933 | Philipps | 222/391 |
| 2,507,254 | 5/1950 | Jones | 222/391 X |
| 2,530,359 | 11/1950 | Peterson. | |
| 2,561,825 | 7/1951 | Sherbondy. | |
| 3,141,583 | 7/1964 | Mapel et al. | |
| 3,144,178 | 8/1964 | Sarnoff | 222/327 |
| 3,256,884 | 6/1966 | Hill et al. | |
| 3,307,548 | 3/1967 | Kachergis. | |
| 3,353,716 | 11/1967 | Fuchs, Jr. | 222/391 X |
| 3,535,068 | 10/1970 | Larson. | |
| 3,712,516 | 1/1973 | Stamets et al. | |
| 3,767,085 | 10/1973 | Cannon et al. | 222/327 |
| 3,819,091 | 6/1974 | Hollender. | |
| 3,905,365 | 9/1975 | Colombo | 604/209 |
| 3,983,947 | 10/1976 | Wills et al. | |
| 4,090,639 | 5/1978 | Campbell et al. | 222/391 X |
| 4,174,068 | 11/1979 | Rudolph. | |
| 4,257,267 | 3/1981 | Parsons. | |
| 4,330,070 | 5/1982 | Doubleday. | |
| 4,506,810 | 3/1985 | Concalves | 222/391 |

Primary Examiner—H. Grant Skaggs
Attorney, Agent, or Firm—Larson and Taylor

[57] ABSTRACT

A paint dispenser in the form of a housing which mounts a paint filled syringe at one end and has a rod which moves axially, under the control of a trigger, to dispense paint from the syringe. Trigger movement in one direction acts through a cup shaped device to move the rod axially to feed paint, while the trigger is disengaged from the rod during its return movement.

20 Claims, 6 Drawing Figures

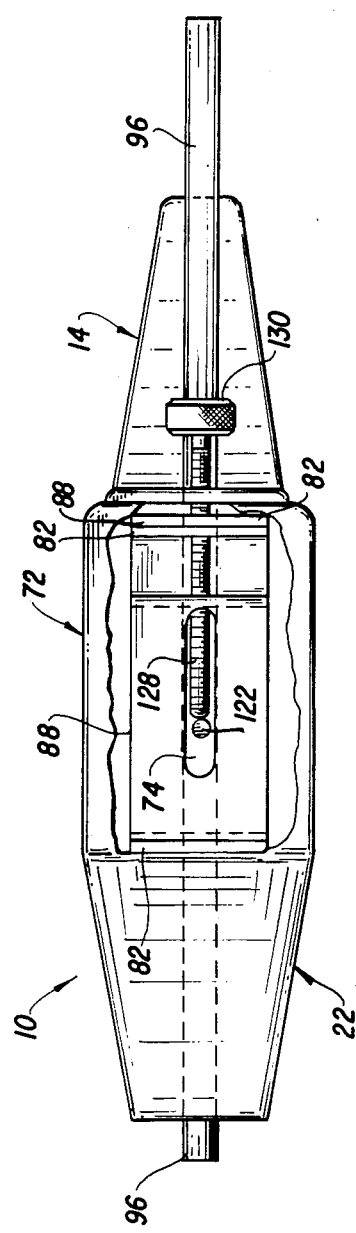

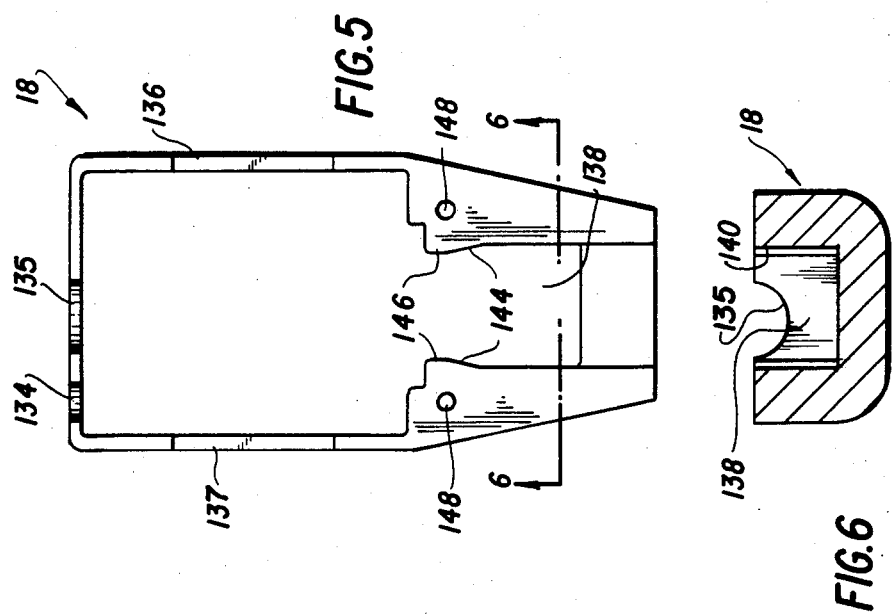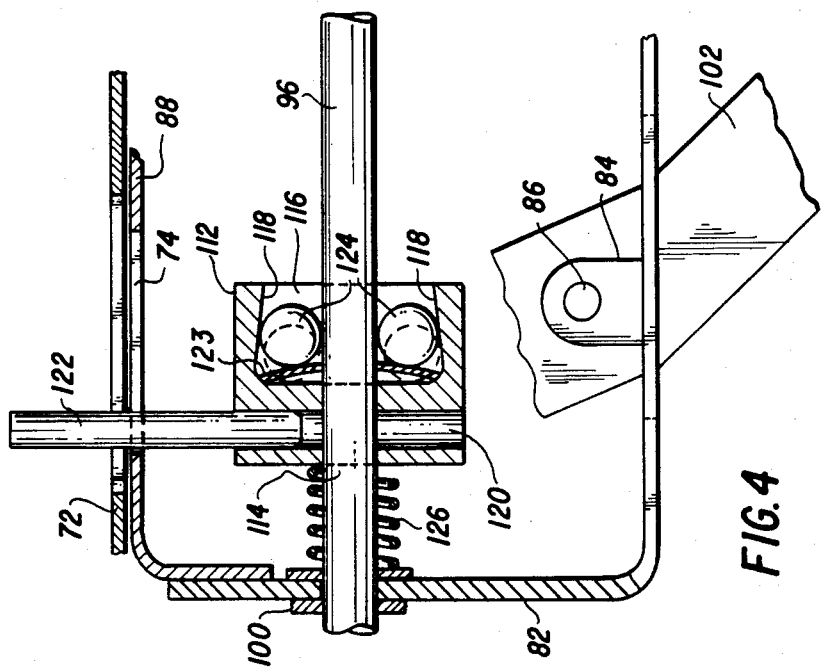

PAINT DISPENSER

FIELD OF THE INVENTION

The present invention relates to a manually operated dispenser for painting with a very fine line.

BACKGROUND OF THE INVENTION

In many fields which utilize a mechanism for advancing an elongate rod, there is the need for a clutch mechanism for selectively engaging and axially advancing the rod a desired distance. In particular, there is the need for a mechanism that can accurately be controlled for advancing the rod smoothly in various increments that include very small distances. One such field in which such a mechanism is needed is the field of dispensers.

There are many dispensing mechanisms for dispensing fluid materials. While many of the prior art devices are concerned with "accurate" dispensing, the amount of fluid dispensed is normally not that critical. However, in the field of painting where the artist must know the exact amount of paint being applied and the form of the applied paint (e.g. in droplets, spray or a fine line, in order to achieve the artistic expression, it is critical that the artist have accurate control over the paint being dispensed in both the rate of dispensing, the quantity dispensed, and the start and stop times of the dispensing. It is also important for the artist to have a paint applicator which "feels good" so that the artistic expression can be readily transferred from the mind of the artist through the artist's hand and accurately relayed by the painting mechanism. Finally, there is the requirement for changing paint colors or types, which often means reusing an earlier paint type.

Thus, there is a need for a paint dispenser in which the paint can be contained in a removable cartridge, and in which the paint can be accurately dispensed from the cartridge in a known amount and in a known pattern. The paint dispenser must also be capable of immediately dispensing the paint, on the one hand, and of immediately terminating the dispensing of paint, on the other hand.

Most of the solutions to dispensing material from a cartridge have utilized dispensing guns which incorporate a movable rod that is insertable into one end of the dispenser and which pushes a piston through the cartridge to expel the material out the other end. The means for advancing the rod have included a plate that is canted into engagement with the rod by a lever and a rod that has ratchet teeth and a lever which engages those teeth. These devices are disclosed in U.S. Pat. Nos. 2,530,359 to Peterson; 2,561,825 to Sherbondy; 3,141,583 to Mapel et al; 4,257,267 to Parsons; and 4,330,070 to Doubleday. Unfortunately, in those devices it is not possible to have an infinitesimal control over the rod. This is because the ratchet teeth limit the rod movement to discrete steps in those models or because there is an inability to accurately control the rod movement because in models using the canted plate as a result of that design and also as a result of the eventual ware that develops between the plate and the rod being advanced.

SUMMARY OF THE INVENTION

Accordingly, it is a purpose of the present invention to provide a linear one-way clutch mechanism for selectively, accurately advancing an elongate rod in one axial direction. It is also the purpose of the present invention to provide such a mechanism for the engagement and accurate, variable step-wise advancing of a piston in a first axial direction during one operation stroke, and for the disengagement from the piston so that at the end of the stroke the mechanism can be moved in the opposite axial direction without moving the piston.

In particular it is a purpose of the present invention to incorporate a linear one way clutch mechanism in a dispenser for dispensing a fluid material in an accurate amount in a known shape and at known times. Further, it is a purpose to provide such a dispenser that utilizes removable cartridges so that the type of dispensed fluid material can be readily changed.

Accordingly, the present invention in a broad embodiment provides a mechanism for axially advancing an elongate rod. The mechanism comprises a means for mounting the rod, a means for engaging the rod and moving it in a first axial direction, and a means for moving the rod engaging means. The rod engaging means comprises a linear one-way clutch that includes a cup-shaped member having a recess therein and is mountable on the rod, and a rod engaging element mounted in the recess and selectively positionable between the recess walls and an inserted rod.

In a more specific application, the present invention incorporates a dispenser for dispensing a fluid material contained in a removable cartridge. The cartridge has a piston located at one end and a nozzle located at the other end. Means are provided for accurately, axially positioning a rod into contact with the cartridge piston and advancing the rod and piston through the cartridge to dispense the material.

In a paint dispenser according to the present invention, the invention comprises a removable syringe having a thin needle projecting from one end and a piston located in the other end. The dispenser comprises a rod and means for positioning the rod in the axial direction in very small increments. A method according to the present invention in the field of painting comprises inserting a syringe having a needle at one end and a piston plunger at the other end into a dispenser having a rod and a trigger actuated mechanism for advancing the rod, and then applying the paint by pulling the trigger with the result that the paint is dispensed in a very thin stream.

In a particular embodiment of a dispenser, the dispenser comprises a housing having an elongate body and a handle. The body comprises means for removably mounting a fluid material containing cartridge, the cartridge including a plunger slidably mounted in a container. The dispenser further includes a rod mounted for axial movement in the housing body in axial alignment with the cartridge plunger when the cartridge is installed, and a means for axially moving the rod. The rod moving means comprises a trigger mounted to the handle and a rod engaging means for engaging the rod and advancing the rod in a first direction in contact with the plunger of an installed cartridge. The rod engaging means comprises a cup shaped member having a recess therein and at least one rod engaging element mounted in the recess. The cup shaped member is slidably mounted on the rod such that the element becomes interposed between the rod and the wall defining the recess when the trigger is pivoted in a first direction and becomes disengaged therebetween when the trigger is pivoted in the opposite direction.

These and other objects, advantages, and features of the present invention will be set forth in or become apparent from the detailed embodiment depicted in the drawings and described in detail hereinbelow.

BRIEF DESCRIPTION OF THE DRAWINGS

FIG. 3 is a top plan view, with parts removed showing underlying features of the dispenser depicted in FIG. 1.

FIG. 4 is a cross-sectional view of the rod advancing means of the dispenser with parts removed;

FIG. 5 is a side elevational view of the inside of one cartridge cover of the dispenser depicted in FIG. 1 showing details of the cartridge retaining means.

FIG. 6 is a cross-sectional view taken along line 6—6 of FIG. 5.

DETAILED DESCRIPTION OF THE PREFERRED EMBODIMENT

Figure 1:
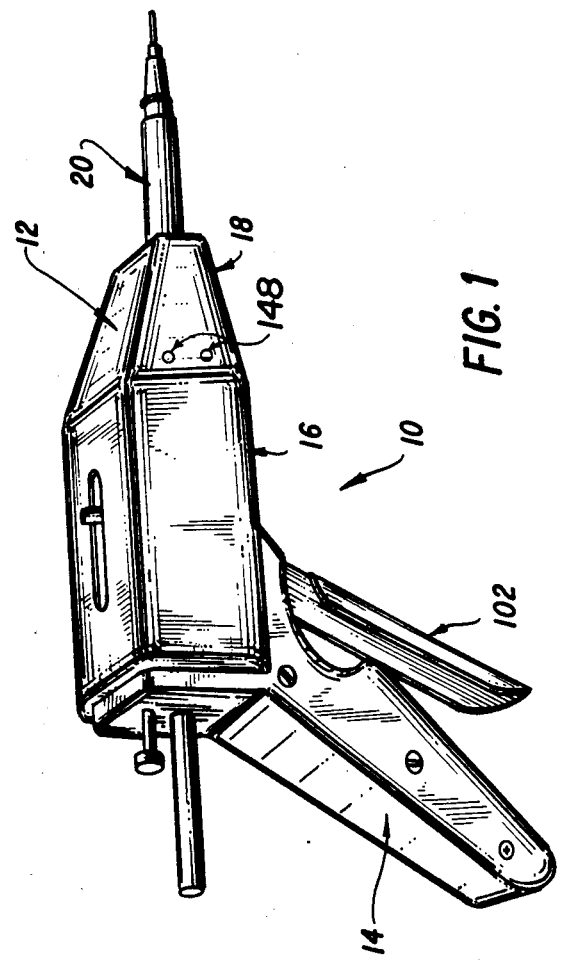
FIG. 1 is a perspective view of a paint dispenser according to the present invention.
Figure 2:
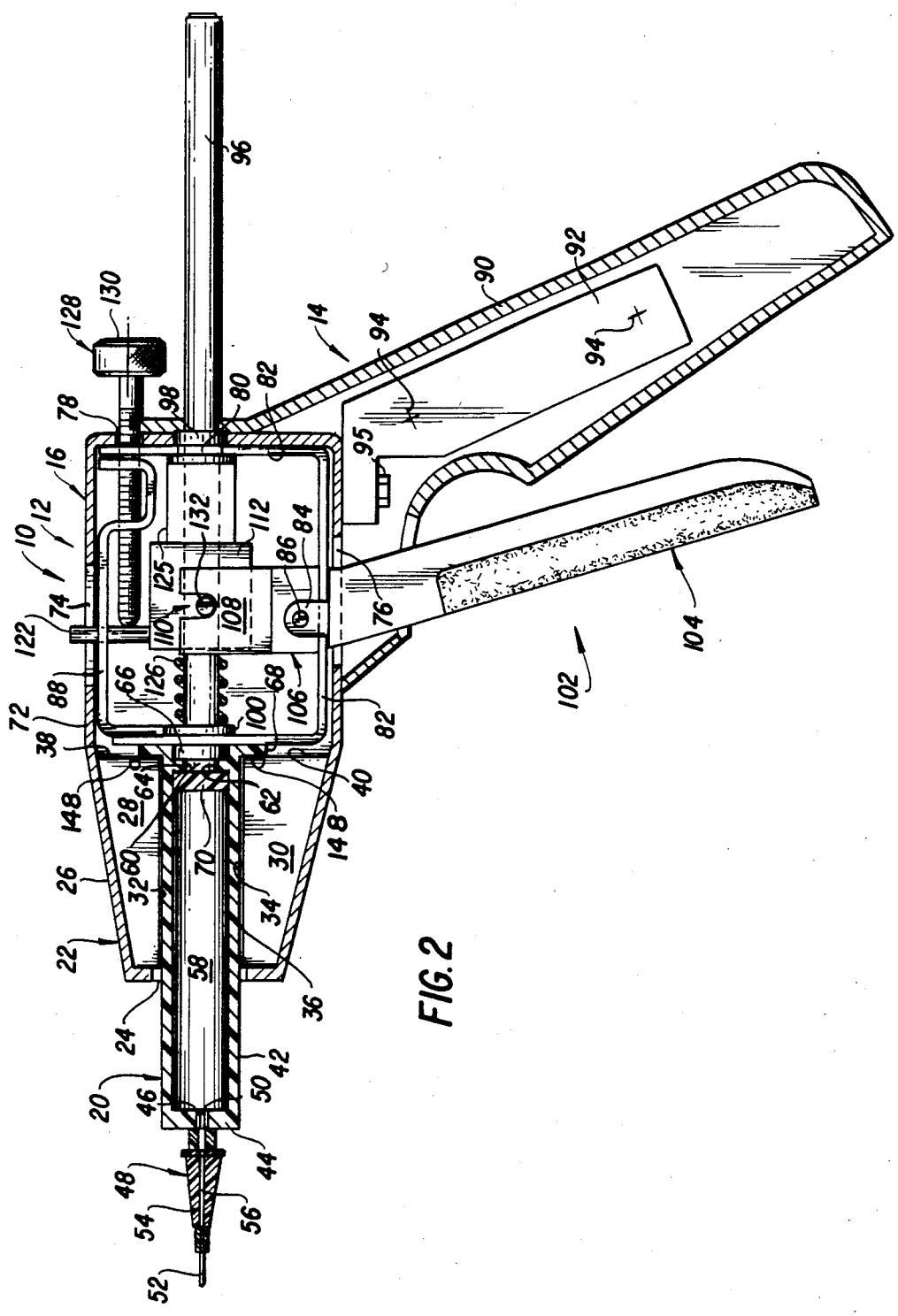
FIG. 2 is a cross-sectional, elevational view taken in scale of the dispenser depicted in FIG. 1.

With reference now to the figures wherein like numerals represent like elements throughout the several views, a cartridge dispensing gun or dispenser 10 is depicted. With particular reference to FIGS. 1, 2 and 3, dispensing gun 10 comprises a body 12 and an integral handle 14. Body 12 is preferably made from machine gauge aluminum and comprises a split housing 16 made of side covers 18 removably attached to each other. Securely mounted inside housing 16 and projecting out the front part thereof is a syringe 20.

With particular reference to FIG. 2, body 12 includes a front portion 22 having a square orifice 24 through the front end thereof. Front portion 22 is comprised of walls 26 and an upper and a lower retaining section 28 and 30. Retaining sections 28 and 30 extend inwardly from the inner sides of walls 26 and terminate in two parallel sides 32 and 34, respectively which together define a channel 36 therebetween. Retaining sections 28 and 30 also have transversely extending ends 38 and 40.

Syringe 20 is comprised of a hollow tubular housing 42 preferably made from a rigid plastic material. Housing 42 has a forward end 44 that is provided with a bore 46. A needle assembly 48 having a rearwardly projecting boss 50 is removably received and mounted inside bore 46. Needle assembly 48 has a thin needle 52, which may be removably mounted, protruding out the front end of an assembly base 54. Running completely through needle assembly 48 from needle 52 through boss 50 is a thin bore 56 that communicates with an interior chamber 58 of syringe housing 42. Chamber 58 extends the entire length of housing 42 through a rearward opening 60. Spaced slightly forward of opening 60 is an inwardly extending flange 62 which defines an opening 64 between the flange edges and a rear plenum 66 in the space between flange 62 and syringe rearward opening 60. An outwardly extending flange 68 is mounted at the very rearward end of syringe housing 42 and provides a means for cooperating with dispenser retaining section ends 38 and 40 for preventing syringe 20 from being pushed forwardly out of dispensing gun 10. A slidable piston 70 is also mounted inside syringe housing chamber 58 and is shown in the rearwardmost position in FIG. 2. Piston 70 is preferably made from a plastic material which will, on the one hand maintain its rigidity, yet on the other hand will still provide a sufficient seal with the interior syringe walls that define chamber 58.

Dispensing gun housing 16 also includes a main portion 72. Main portion 72 has an upper slot 74 (also shown in FIG. 3), a lower slot 76, and two circular orifices through the end portion thereof, an upper orifice 78 and a lower orifice 80.

Mounted inside housing main portion 72 is a metal U-shaped bracket 82 that is preferably made from steel such as 16 gauge steel. Bracket 82 is provided with two upstanding ears 84 (only one of which is shown) integral with the bottom thereof. Ears 84 are provided with mounting holes 86 for mounting bracket 82 to dispenser gun housing 16. The bottom of bracket 82 is also provided with a slot (not shown) and the two sides are provided with two axially aligned orifices in the central portions thereof (also not shown).

An S-shaped guide 88 is integrally mounted to the top ends of bracket 82. A forward end of bracket 82 engages flange 68 of the syringe and thus forms a flange support means therefor. Preferably guide 88 has the same width as bracket 82 and thus together they form a rigid, substantially box shaped frame. A rearward part of guide 88 is U-shaped so as to provide a mounting for an adjustment means described hereinbelow. Two axially aligned, threaded orifices are provided in each wall of the U-shaped section of guide 88. Guide 88 is also provided with a slot (not shown) that is aligned with and has slightly smaller dimensions than upper slot 74 in housing main portion 72.

Handle 14 is depicted in FIGS. 1 and 2 and comprises a grip portion 90 and a grip support 92 mounted to grip portion 90 with screws, not shown, but indicated by location markings 94. Handle 14 is detachably mounted to the bottom of body main portion 72 with two screws 95 threaded into threaded orifices (not shown) therein. In the preferred embodiment, handle 14 forms an angle of 115° with the bottom of body 12.

Extending through lower orifice 80 of body housing main portion 72 is a smooth rod 96. Rod 96 is preferably made from a hard stainless steel and is slidably mounted in a rearward bushing 98 which in turn is mounted in lower orifice 80 and the rearward wall in bracket 82, and a forward bushing 100 mounted in the forward wall of bracket 82. Bushings 98 and 100 while permitting sliding movement of rod 96 have an inner size so as to provide friction to such movement. Thus, rod 96 must be forced in a given direction before it will move.

A rod moving means for moving rod 96 in the forward direction toward an installed syringe 20 includes a trigger 102 that is pivotally mounted to housing 16 with bracket ears 84 and the attachment screw (not shown). Trigger 102 comprises a handle section 104 extending below the pivot point and a blade section 106 extending above the pivot point. In the particular embodiment depicted in FIG. 2, blade section 104 is comprised of a Z-shaped piece that results in an upper, transversely displaced stirrup section 108. Stirrup section 108 has a notch 110 in the upper edge thereof. Handle section 104 has a V-shaped cross section with the base of the V being in the forward part so as to provide a smooth gripping surface. Preferably, trigger 102 is made from 16 gauge steel that has been bent to form the aforedescribed sections. In a modification, trigger blade section 106 can comprise a U-shaped stirrup with two upstanding members having aligned notches 110. In addition, as depicted in FIG. 2, handle section 104 is mounted at a rearward angle to blade section 106. A presently preferred angle is 105°.

As more clearly shown in FIG. 4, trigger stirrup 108 is connected to a rod engaging means for engaging and moving rod 96 and that comprises a cup shaped member 112 having a longitudinal bore 114 completely therethrough and through which cup shaped member 112 is slidingly mounted on rod 96. Cup shaped member 112 moves rod 96 in the direction of an installed syringe 20 when trigger 102 is pivoted by force in the counterclockwise direction as shown in FIG. 2 and is disengaged from rod 96 when trigger 102 is pivoted in the opposite direction, that is in the clockwise direction as depicted in FIG. 2.

Cup shaped member 112 is preferably cylindrical in overall shape having a diameter that is preferably the same as the length thereof. For a rod 96 having a diameter of slightly less than ⅜ of an inch (375 one-thousandths), cup shaped member 112 preferably has a diameter and a length of ¾ of an inch (750 thousandths). Cup shaped member 112 is provided with a rearward recess 116 defined by a circular wall 118 slanted radially inwardly in the rearward, axial direction. An exemplary inward angle of slant is 7°. As shown in FIG. 4, bore 114 is concentrically located longitudinally through cup shaped member 112. Cup shaped member 112 is further provided with a vertical bore 120 that extends completely through member 112 and intersects bore 114 which divides bore 120 into an upward part and lower part. Mounted in the upward part of vertical bore 120 is a stop and alignment rod 122. As clearly shown in FIGS. 3 and 4, rod 122 extends upwardly through the slot in guide 88 and upper slot 74 in housing 16 and is guided in its forward and rearward motion, thereby indicating alignment of cup shaped member 112.

As also shown in FIG. 4, mounted inside recess 116 of cup shaped member 112 are a plurality of rigid, metal balls 124 which are spring loaded by an elastomer spring 123 and interposed between rod 96 and recess wall 118. Spring 123 is in the shape of a curved disk with a central orifice and holds balls 124 in the same vertical plane.

With reference again to FIG. 2, a stop block 125 is mounted on rod 96 which extends through a longitudinal bore in block 125. Stop block 125 applies a force to the circular array of spring loaded balls 124 when trigger 102 is rotated in the clockwise direction. This force allows balls 124 to move against spring 123 in the forward direction toward the expanding circular incline in cup shaped member 112, thereby permitting shaft 96 to move in the rearward direction.

As also shown in FIG. 4, a coil spring 126 is mounted concentrically around rod 96 and engages the forward end of cup shaped member 112 and the rearward side of bracket 82. Thus, spring 126 provides a resilient force in opposition to the forward motion of cup shaped member 112 and provides a restoring force in the rearward direction of member 112 when trigger 102 is released.

The rearward travel of cup shaped member 112 is limited by a stop means. The stop means, as shown in FIG. 2, is comprised of rod 122 engaging a threaded adjustment screw 128 having an enlarged, knurled cap 130. Adjustment screw 128 extends through upper orifice 78 in housing 16 and is threaded in the threaded orifices in guide 88. Thus, the rearward travel of cup shaped member 112 is determined by the position of adjustment screw 128.

Extending transversely from cup shaped member 112 is a transverse rod 132. Transverse rod 132 extends through stirrup notch 110 in trigger blade section 106. Thus, when trigger 102 is rotated in the counterclockwise direction as shown in FIG. 2, transverse rod 132 and hence cup shaped member 112 are moved in the forward direction against spring 126.

One of the split covers 18 of dispensing gun body 12 is depicted in FIGS. 5 and 6. Split cover 18 is provided with an upper circular notch 134 which forms a side portion of upper orifice 78, and a lower circular notch 135 which forms a side portion of lower orifice 80. Split cover 18 is also provided with a lower transverse recess 136 which fits over handle 14 when cover 18 is installed and an upper transverse recess 137 which forms half of slot 74. The forward end of split cover 18 has a square, U-shaped slot 138 defined by transverse walls 140 and ending in a U-shaped front opening. Slot walls 140 terminate at the rearward end with inwardly directed bosses 144 having transversely straight rearward edges 146 which form a part of ends 38 and 40 of retaining sections 28 and 30. Covers 18 are mounted onto body 12 with screws (not shown) which extend through holes 148.

Turning again to FIG. 2, it can be seen that syringe 20 is rigidly held in place and aligned by longitudinally extending retaining sections sides 32 and 34. Syringe flanges 68 are received in the space between retaining section ends 38 and 40 at the forward end thereof and the forward wall of bracket 82. Located in the space between retaining section ends 38 and 40 and bracket 82 is a compression or lock washer (not shown). Syringe flanges 68 are received in this space by guiding the syringe 20 through the two parallel sides 32 and 34 and rotating the syringe 90°. The washer applies a force to syringe flanges 68 against face of ends 38 and 40, thereby preventing longitudinal, forward movement of syringe 20. When thus mounted, as seen if FIG. 2, rod 96 is in actual alignment with syringe rearward opening 60 and flange opening 64. Thus, when rod 96 is moved forwardly, the forward end thereof can engage piston 70.

In operation, a syringe 20 is inserted in dispensing gun 10. Adjustment screw 128 is adjusted to longitudinally position cup shaped member 112. Then, as trigger 102 is squeezed, and thus rotated in the counterclockwise direction as depicted in FIG. 2, spring loaded balls 124 are forced between rod 96 and walls 118 as cup shaped member 112 is moved forwardly. By selecting appropriate dimensions for balls 124, the amount of forward travel necessary for engagement of balls 124 with rod 96 is minimized. Continued squeezing of trigger 102 results in both cup shaped member 112 and rod 96 being positioned in the forward direction. Upon release of trigger 102, spring 126 pushes cup shaped member 112 in the rearward direction, thereby forcing balls 124 to roll forwardly in recess 116, as depicted in dashed lines in FIG. 4, and thereby permit the return of trigger 102 and attached cup shaped member 112 to their "rest" positions. Becasue balls 124 are disengaged from rod 96, and because rod 96 is held frictionally in place by rearward and forward bushings 98 and 100, rod 96 does not move rearwardly. During the forward movement of cup shaped member 112, the member is prevented from rotating by rod 122 in slot 74 and by trigger handle section 104 in slot 76.

The present invention has now been described with respect to a particular paint dispenser which can dispense paint from a small nozzle to produce a thin, even line of paint. Different syringe needles 52 can create different thicknesses of the paint line. Syringes 20 can be loaded with a single color or with more than one color to create an even greater affect. In addition, syringes 20 can be used with acrylic paints, water colors, or any other medium that can be thinned sufficiently to flow through needle 52. Preferable 6 cc disposable syringes that have a piston 70 made of Teflon and thus is not affected by the paint, on the one hand, and can easily slide inside syringe housing 42.

The present paint dispenser can be used to paint tree limbs, bark on trees, log cabins, flowers, leaves, stems, signatures, and any other artistic item requiring a fine line.

Other features, objects and advantages of the present invention would be apparent to those of ordinary skill in the art.

We claim:

1. A dispenser for holding a removable, elongate cartridge containing a fluid material and for dispensing the fluid material from the cartridge, the cartridge including a plunger slidable mounted in a container, said dispenser comprising:
   a housing having an elongate body and a handle, said body comprising means for removably mounting a fluid material containing cartridge at a forward body end portion;
   a rod mounted for axial, forward and rearward movement in said housing body in axial alignment with the cartridge plunger when the cartridge is installed in said body; and
   means for axially moving said rod, said rod moving means comprising,
   a trigger pivotally mounted to said housing, and
   rod engaging means for engaging said rod and moving said rod in the direction of an installed cartridge plunger when said trigger is pivoted in a first direction and for disengaging said rod when said trigger is pivoted in the opposite direction, said rod engaging means comprising a cup shaped member having a recess therein defined by a recess wall and slidably mounted on said rod such that said recess concentrically surrounds said rod, a plurality of balls mounted in said recess such that said balls become interposed between said rod and said recess wall when said trigger is pivoted in said first direction and said member is moved in the direction toward the location for the cartridge plunger, said recess walls being slanted radially inwardly in the rearward axial direction, away from said location for the cartridge plunger.

2. A dispenser as claimed in claim 1 wherein said balls are rigid.

3. A dispenser as claimed in claim 1 and further including spring means for resiliently urging said cup shaped member in the rearward axial direction, away from the location for the cartridge plunger.

4. A dispenser as claimed in claim 3 wherein said cup shaped member further includes a forward end and wherein said spring means comprises a coil spring mounted concentrically around said rod such that one end of said spring engages said forward end of said member.

5. A dispenser as claimed in claim 1 and further including stop means for limiting the rearward movement of said cup shaped member thereof.

6. A dispenser as claimed in claim 5 wherein said stop means is adjustable and comprises an elongate member rigidly mounted to said cup shaped member and extending outwardly therefrom, and a threaded rod mounted to the rearward end of said housing.

7. A dispenser as claimed in claim 1 and further including alignment means for maintaining the alignment of said cup shaped member during the forward and rearward movement thereof.

8. A dispenser as claimed in claim 7 wherein said alignment means comprises an elongate member rigidly mounted to said cup shaped member and extending outwardly therefrom in a direction transverse to the movement thereof, and an elongate guide slot in said housing, said guide slot extending parallel to said rod, and said elongate member extending through said guide slot.

9. A mechanism for axially advancing an elongate rod comprising:
   means for mounting the rod so as to permit axial movement;
   rod engaging means for engaging the rod and moving the rod in a first axial direction, comprising:
   a cup-shaped member having a recess therein defined by a recess wall and being slidably mountable on the rod such that said recess concentrically surrounds the rod, said recess walls being slanted radially inwardly in a direction opposite to said first direction,
   a plurality of balls mounted in said recess such that said balls become interposed between said recess wall and the elongate rod when said rod engaging means is moved in said first axial direction, and
   means for moving said rod engaging means in said first axial direction.

10. A mechanism as claimed in claim 9 wherein said balls are rigid.

11. A mechanism as claimed in claim 9 wherein said rod engaging means further comprises resilient means for resiliently maintaining said balls in a coplaner orientation concentrically located around the rod.

12. A mechanism as claimed in claim 9 wherein said rod engaging means further comprises resilient means for resiliently maintaining said balls into engagement with the rod.

13. A mechanism as claimed in claim 9 and further including spring means for resiliently urging said cup shaped member in the said opposite axial direction.

14. A mechanism as claimed in claim 13 wherein said cup shaped member further includes a forward end wall facing said first axial direction, said wall having an orifice therein for slidably receiving the rod, and wherein said spring means engages said forward end wall.

15. A mechanism as claimed in claim 9 and further including stop means for limiting the rearward movement of said cup shaped member.

16. A mechanism as claimed in claim 9 wherein said moving means includes an elongate trigger means for pivotably mounting said trigger such that one end of said trigger is operatively connected to said cup shaped member.

17. A paint dispenser comprising, in combination:
   a housing having a body and a handle;
   a rod mounted for axial forward and rearward movement in said housing body;
   a syringe removably fixedly mounted in said housing in axial alignment with said rod and comprising a hollow elongate container, a needle having a fine bore therein in fluid communication with said container, said needle being mounted to the forward end of said container, and a piston slidably, sealingly mounted inside said container and engagble by said rod;

rod moving means for accurately, positively moving said rod in said forward direction in a continuous motion;

said rod moving means comprising a trigger pivotally mounted to the handle and a rod engaging means for moving the rod in the direction towards the piston when the trigger is pivoted in a first direction and for disengaging the rod when the trigger is pivoted in the opposite direction, said rod engaging means comprising a cup-shaped member having a recess therein defined by a recess wall and slidably mounted on said rod such that said recess concentrically surrounds said rod, and at least one rod engaging element mounted in said recess, such that said element becomes interposed between said rod and said recess wall when said trigger is pivoted in said first direction and said member is moved in the direction toward the piston, and said recess walls being slanted radially inwardly in the rearward axial direction.

18. A paint dispenser as claimed in claim 17 wherein said rod engaging elements comprise a plurality of rigid balls.

19. A paint dispenser as claimed in claim 17 and further including spring means for resiliently urging said cup shaped member in the rearward axial direction, away from the location for the cartridge plunger.

20. A paint dispenser accoring to claim 17, said syringe having a rear transversely extending syringe flange, and said body comprising a front portion which forms an elongated recess which laterally supports said syringe, said front portion also including transversely extending rear ends, said housing including a flange support means immediately rearward of the syringe flange, whereby the syringe flange is held in a space between said rear ends of the front portion and said flange support means, said front portion being formed of a plurality of parts which are separable from each other in a transverse direction along a line passing axially through the elongated recess, whereby, upon transverse separation of the front portion parts, a syringe can easily be inserted into or removed from said front portion.

* * * * *